United States Patent
Sarikaya et al.

(10) Patent No.: US 9,767,091 B2
(45) Date of Patent: Sep. 19, 2017

(54) METHODS FOR UNDERSTANDING INCOMPLETE NATURAL LANGUAGE QUERY

(71) Applicant: Microsoft Technology Licensing, LLC, Redmond, WA (US)

(72) Inventors: Ruhi Sarikaya, Redmond, WA (US); Xiaohu Derek Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/622,119

(22) Filed: Feb. 13, 2015

(65) Prior Publication Data

US 2016/0217124 A1     Jul. 28, 2016

Related U.S. Application Data

(60) Provisional application No. 62/107,213, filed on Jan. 23, 2015.

(51) Int. Cl.
*G06F 17/27* (2006.01)
*G10L 15/18* (2013.01)

(52) U.S. Cl.
CPC ........ *G06F 17/276* (2013.01); *G06F 17/2715* (2013.01); *G06F 17/2765* (2013.01); *G10L 15/18* (2013.01)

(58) Field of Classification Search
CPC ............................ G06F 17/276; G06F 17/2715
USPC ............................................ 704/2, 5, 9, 203
See application file for complete search history.

(56) References Cited

U.S. PATENT DOCUMENTS

| | | |
|---|---|---|
| 6,167,369 A | 12/2000 | Schulze |
| 6,292,772 B1 | 9/2001 | Kantrowitz |
| 6,766,320 B1 | 7/2004 | Wang et al. |
| 7,644,054 B2 | 1/2010 | Garg et al. |
| 7,937,402 B2 | 5/2011 | Feng et al. |
| 8,117,178 B2 | 2/2012 | Qi et al. |
| 8,326,634 B2 | 12/2012 | Di Cristo et al. |
| 8,812,534 B2 | 8/2014 | Platt et al. |
| 9,354,709 B1 * | 5/2016 | Heller ................ G06F 3/017 |
| 2004/0148170 A1 | 7/2004 | Acero et al. |

(Continued)

OTHER PUBLICATIONS

Yossef, et al., "Context-Sensitive Query Auto-Completion", In Proceedings of the 20th International Conference on World Wide Web, Mar. 28, 2011, 10 pages.

(Continued)

*Primary Examiner* — Marcellus Augustin
(74) *Attorney, Agent, or Firm* — Merchant & Gould, P.C.

(57) ABSTRACT

Analysis of incomplete natural language expressions using n-gram analysis and contextual information allows one or more domains to be predicted. For each domain, intent a likely intent of the user is determined using n-gram analysis and contextual information. Intent may correspond to functions of a domain application. In such a case, information required for the functions to execute the application may be populated using n-gram analysis and/or contextual information. The application may then be presented to the user for confirmation of intent. Confirmation of intent along with the incomplete natural language expression and contextual information may then be used to train one or more models used to predict user intent based on incomplete natural language expressions.

19 Claims, 10 Drawing Sheets

(56) References Cited

U.S. PATENT DOCUMENTS

| | | | |
|---|---|---|---|
| 2004/0199499 A1 | 10/2004 | Lazaridis et al. | |
| 2005/0017954 A1 | 1/2005 | Kay et al. | |
| 2012/0136651 A1* | 5/2012 | Jawerth | G06F 1/162 704/9 |
| 2012/0166177 A1* | 6/2012 | Beld | G06F 17/27 704/9 |
| 2012/0323898 A1* | 12/2012 | Kumar | G06F 17/30867 707/723 |
| 2014/0181137 A1 | 6/2014 | Stein | |
| 2014/0222422 A1* | 8/2014 | Sarikaya | G06F 17/279 704/231 |
| 2014/0365209 A1* | 12/2014 | Evermann | G06F 17/279 704/9 |
| 2016/0042748 A1* | 2/2016 | Jain | G10L 25/48 704/9 |
| 2016/0154792 A1* | 6/2016 | Sarikaya | G06F 17/2785 704/9 |

OTHER PUBLICATIONS

Shokouhi, Milad, "Learning to Personalize Query Auto-Completion", In Proceedings of the 36th International ACM SIGIR Conference on Research and Development in Information Retrieval, Jul. 28, 2013, 10 pages.

Kharitonov, et al., "Intent Models for Contextualising and Diversifying Query Suggestions", In Conference of 22nd ACM International Conference on Information and Knowledge Management, Sep. 2, 2013, 8 pages.

Tablan, et al., "A Natural Language Query Interface to Structured Information", In Proceedings of the 5th European Semantic Web Conference on the Semantic Web: Research and Applications, Jun. 1, 2008, 15 pages.

PCT International Search Report and Written Opinion in PCT/US2016/014409, mailed May 3, 2016, 11 pages.

Ramaswamy, et al., "A Pervasive Conversational Interface for Information Interaction", In proceedings of the Sixth European Conference on Speech Communication and Technology(Eurospeech), vol. 6, Sep. 1999, Sep. 1999, 4 Pages.

Celikyilmaz, et al., "A Joint Model for Discovery of Aspects in Utterances", In Proceeding of the 50th Annual Meeting of the Association for Computational Linguistics, Jan. 2012, 9 Pages.

PCT Second Written Opinion Issued in PCT Application No. PCT/US2016/014409, Mailed Date: Dec. 16, 2016, 5 Pages.

PCT International Preliminary Report on Patentability Issued in PCT Application No. PCT/US2016/014409, dated Apr. 4, 2017, 6 Pages.

* cited by examiner

METHODS FOR UNDERSTANDING INCOMPLETE NATURAL LANGUAGE QUERY

RELATED APPLICATIONS

This application claims the priority to and benefit of U.S. Provisional Application No. 62/107,213 filed Jan. 23, 2015, which application is hereby incorporated by reference.

BACKGROUND

Various computing devices use language understanding applications (e.g., digital assistant applications) to receive inputs from users. Language understanding applications, however, often receive incomplete inputs such as textual and audio inputs. For example, as a user types or gestures, the input is incomplete at least until the user stops inputting the input. Thus, real-time interpretation of input requires understanding of incomplete input. Real-time understanding of incomplete natural language expressions may improve both computer and user efficiency, as requiring a user to complete the expression wastes user time and slows down the time it takes for a computer to deliver a response to a user. In this regard, digital assistant applications may have the need to interpret incomplete textual inputs and audio inputs.

Interpreting incomplete inputs presents challenges. For example, a user may desire the computer to perform a specific action (or actions) when entering incomplete input. An "action" is any function executable on a computer, e.g., "create a meeting," "get a route," "create a task," "set an alarm," and the like. A "desired action" is a specific action or actions that a user seeks to perform while entering incomplete input (the desired action(s) will be referred to herein as "the intent of the user" or "user intent"). Some language understanding applications supply autocomplete suggestions to a user based on incomplete input. However, these suggestions fail to address the user's intent, e.g., fail to facilitate performance of a desired action.

It is with respect to these and other general considerations that aspects of the technology have been made. Also, although relatively specific problems have been discussed, it should be understood that the embodiments should not be limited to solving the specific problems identified in the background.

SUMMARY

The disclosure generally relates to interpreting incomplete natural language inputs by a computing device. In aspects of the technology, one or more devices take an action based on the incomplete natural language expression. For example, an incomplete natural language expression may be received by a computing device as input. The input may be one or more of textual, gesture, or speech input. From this incomplete natural language expression, one or more predictions regarding the domain or domains (i.e., a group of related actions such as a calendar domain, an alarm domain, etc.) in which a user wishes to operate is made.

Additionally, aspects of the technology include predicting the likelihood that a user's intent is directed to a specific action of a particular domain. For example, one domain is the calendar domain, and examples of actions that may be taken in a calendar domain include setting an appointment, canceling an appointment, or moving an appointment. Based on the incomplete natural language expression, an intent hypothesis for each action in the domain is created for each action. The intent hypothesis is a prediction that the action in the domain is the intent of the user (i.e., desired action). Because multiple domains may be predicted, and each domain may have multiple actions, multiple domain predictions may result in multiple intent hypotheses.

In an aspect, if the intent hypothesis is one that uses additional information (e.g., the intent is to create a calendar appointment, which would use date, time, attendees, etc.), then an analysis of the incomplete natural language expression and/or other contextual information occurs to obtain the additional information (e.g., finding information related to date, time, and attendees in or related to the incomplete input).

Additionally, a plurality of selectable options (e.g., a GUI for a calendar domain application) may be generated for each predicted domain, and each selectable option may be presented to the user. The selectable options may be ranked based on an analysis of the likelihood that the predicted domain reflects the user's intent, with information being prepopulated in the selectable options (e.g., a date and time for a potential meeting). In aspects of the technology, selection of the selectable option causes the graphical user interface to present a domain application on the user device. A domain application is an application for performing one or more actions in a particular domain. Domain applications use functions to perform actions. For example, a calendar domain application may use a function "create_meeting" to create a meeting. As such, the presentation of a particular domain application may allow the user to fill in any additional information that the domain application did not detect or infer from the incomplete natural language expression and/or other contextual information.

Further, aspects of the technology include a back end learning module to build an incomplete natural language expression analysis model. A back end learning module may use test incomplete natural language expressions. Each test incomplete natural language expression will reflect a real world intent of the user. The test incomplete natural language expression (or elements of the expression) will be analyzed using a variety of techniques to create a prediction algorithm that may be used to predict intent based on an incomplete natural language expression. In an aspect, the test incomplete natural language expression will be equated with one or more completed full query natural language expression models. In this way, the process of building an incomplete natural language expression analysis model can leverage previously built full query natural language expression models.

BRIEF DESCRIPTION OF THE DRAWINGS

Non-limiting and non-exhaustive examples are described with reference to the following Figures.

DETAILED DESCRIPTION

Figure 1:
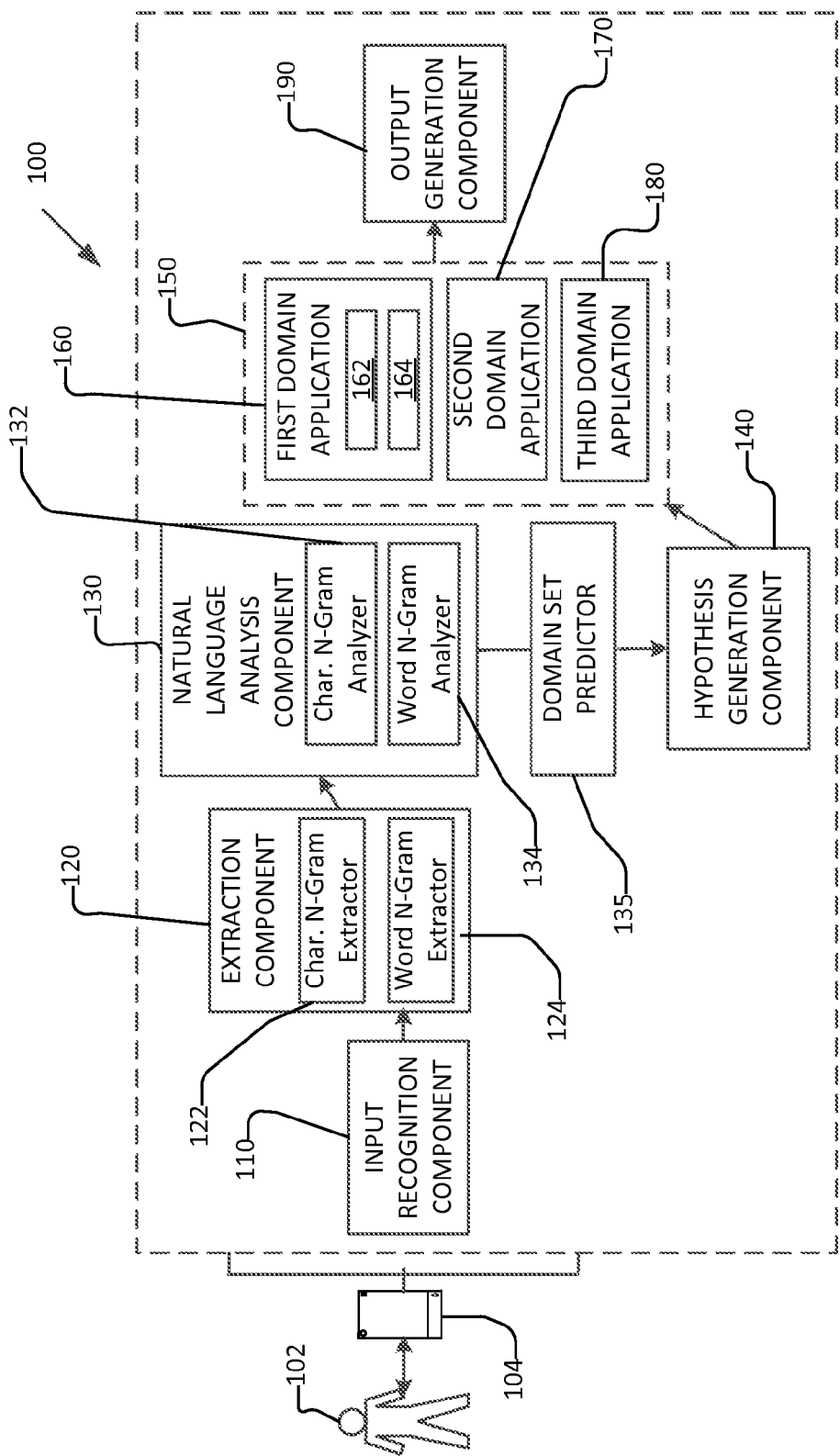
FIG. 1 illustrates an exemplary dynamic system implemented at a client computing device for understanding incomplete natural language expressions, according to an example embodiment.

In the following detailed description, references are made to the accompanying drawings. These drawings are a part of this disclosure, and each drawing provides examples of specific aspects of the technology. Application of the technology is broader than the examples illustrated in the drawings. Indeed, the illustrated aspects may be combined, other aspects may be utilized, and structural changes may be made without departing from the spirit or scope of the present disclosure. Aspects may be practiced as methods, systems or devices. Accordingly, aspects may take the form of a hardware implementation, an entirely software implementation or an implementation combining software and hardware aspects. The following detailed description is therefore not to be taken in a limiting sense, and the scope of the present disclosure is defined by the appended claims and their equivalents.

The present disclosure generally relates to understanding incomplete natural language expressions. An incomplete natural language expression is a string of characters, words, and/or gestures that is missing one or more characters or words. Non-limiting examples of incomplete natural language expressions include incomplete textual input, touch input, gesture input, or speech input. For example, real-time text input by a user to a digital assistant is incomplete at least until the user finishes typing in the input. The technology includes recognition and extraction of the input, analysis of the input to determine a likely user intent, and execution of one or more applications based on the likely user intent.

Consider, for example, while a user is typing, a natural language expression may be incomplete, e.g., "Tomorrow morning I can't mee." The user may be in the process of typing a complete natural language expression, e.g., "Tomorrow morning I can't meet with Jason at 9 am. Cancel the meeting at 9 am." The present technology includes the recognition, extraction, and analysis of incomplete input. In one aspect, this occurs in real-time (e.g. during or substantially contemporaneously with the time when the input is received).

One aspect of the technology may determine a high likelihood that the user's incomplete input is directed at a specific domain, such as calendar domain. For example, the complete expression above explicitly identifies the user's intent to cancel a meeting, which is an action that can be performed in a calendar domain. However, the user's intention to cancel a meeting may also be inferred from incomplete input received. For example, the phrase "I can't mee" may have a likely correlation with the phrase "I can't meet." From the phrase "I can't meet," and context information if available (e.g., a meeting set for tomorrow morning in the user's calendar), a first likely intent of a user to cancel a meeting may be determined. Accordingly, the technology may begin to run a calendar domain application. The computer may prepopulate information in a calendar domain application to cause the cancelation of a specific meeting based on the incomplete natural language expression. Prepopulation of input may be to satisfy one or more functions of the calendar domain application.

Additionally, one aspect of the technology includes determining a second likely intent of a user. For example, based on the incomplete natural expression "Tomorrow morning I can't mee," it may be determined that the user is attempting to access a travel domain. This may occur based on other contextual information available. For example, if it is determined that input suggests a meeting cancelation, and the user is also taking a flight to the meeting destination prior to the scheduled meeting, then a determination may be made that the user likely wishes to cancel the flight. Accordingly, a travel domain application may begin to run and prepopulate information sufficient to cancel the travel arrangements.

Aspects of the technology include having each domain application running in parallel. In one aspect, output is generated to the user, which output allows the user to confirm the intent (or intents) of the incomplete natural language expression.

It should be noted that the example above is provided for illustration purposes. While the technology may be used to analyze incomplete natural language expressions, there is no requirement that a computing system is able to recognize or know that the natural language expression is incomplete. Rather, aspects of the technology include running an incomplete natural language expression analysis on any received input.

FIG. 1 illustrates one aspect of a dynamic system 100 for understanding incomplete natural language expressions. In aspects, the dynamic system 100 may be implemented on a client computing device 104. In a basic configuration, the client computing device 104 is a computing device having both input elements and output elements. The client computing device 104 may be any suitable computing device for implementing the dynamic system 100 for understanding incomplete natural language expressions. For example, the client computing device 104 may be at least one of: a mobile telephone; a smart phone; a tablet; a phablet; a smart watch; a wearable computer; a personal computer; a desktop computer; a laptop computer; etc. This list is exemplary only and should not be considered as limiting. Any suitable client computing device for implementing the dynamic system 100 for understanding incomplete natural language expressions may be used.

In aspects, the dynamic system 100 may include an input recognition component 110, an extraction component 120, a natural language analysis component 130, a domain set predictor 135, a hypothesis generation component 140, a domain component 150, and an output generation component 190. The various components may be implemented using hardware, software, or a combination of hardware and software.

The dynamic system 100 may be configured to process incomplete natural language expressions. In this regard, the dynamic system 100 may facilitate receiving incomplete natural language expressions. In one example, an incomplete natural language expression may include phrases, words, and/or terms in the form of a spoken or signed language input (e.g., a user query and/or request). In another example, a natural language expression may include phrases, words, and/or terms in the form of a textual language input (e.g., a user query and/or request). For example, the incomplete natural language expression, "Tomorrow morning, I can't mee," is missing one or more characters and does not form a complete natural language expression.

In an aspect of the technology, the input recognition component 110 receives input from a user, be it spoken, signed, or typed. The input recognition component 110 interprets the input as a series of characters understandable by a computing device. For example, the dynamic system 100 may include an input recognition component 110 that is a textual input component. In an aspect, a textual input component may be configured to receive input via a touch screen or a keyboard.

Additionally, the dynamic system 100 may include an input recognition component 110 that is a speech recognition component. In aspects, the speech recognition component may include standard speech recognition techniques known to those skilled in the art such as "automatic speech recognition" (ASR), "computer speech recognition," and "speech to text" (STT). In some cases, the speech recognition component may include standard text to speech techniques known to those skilled in the art such as "text to speech." One skilled in the art would recognize that a speech recognition component may include one or more various different types of speech recognition and/or text recognition components.

Additionally, the dynamic system 100 may include an input recognition component 110 that is a gesture recognition component. A gesture recognition component may include stereo cameras, depth awareness cameras, wired devices (such as gloves), gyroscopic devices, controller devices, single cameras and the like.

In aspects, after being received by an input recognition component 110, the input is then sent to the extraction component 120. One aspect of the technology includes an extraction component 120 that has a character n-gram extractor 122. The character n-gram extractor 122 parses input into a sequence of one or more contiguous characters known as character n-grams. As used in the disclosure, the number of characters in a character n-gram will determine the name of the specific n-gram. For example, characters extracted in a "character tri-gram" format would include three contiguous characters of an input. As such, if the word "reminder" were extracted in a tri-gram format, the extracted tri-grams are: "r e m", "e m i", "m i n", "i n d", "n d e", and "d e r". Multiple n-grams may be extracted for a single incomplete natural language expression.

In aspects of the technology, the character n-gram extractor 122 extracts entire expressions irrespective of whether each word in the expression is a word. So for example the phrase "Find Car" may be extracted into a character tri-gram as: "F i n", "i n d", "n d _", "d _C", "_C a", and "C a r", with the "_" character indicating a space. In other embodiments, the space is ignored. Other character n-grams may be used.

In addition, the extraction component 120 may have a word n-gram extractor component 124. Word n-gram extractor component 124 parses an incomplete natural language expression into one or more word n-grams. For example, the word n-gram extractor component 124 may parse the incomplete natural language expression "find car at" into the word bi-grams as "find car" and "car at." It should be noted that partial word n-grams may also be extracted by the word n-gram extractor component 124. For example, the incomplete natural language expression "find ca" may be parsed into a word uni-gram as "find" and "ca." Thus, a word n-gram extractor component 124 may extract partial words into word n-grams and/or full words into n-grams.

The extraction component 120 sends the extracted n-grams to the natural language analysis component 130. In embodiments, contextual words surrounding the n-gram are also sent to the natural language analysis component 130. For example, the following is an example of the contextual word "create" with a partial character uni-gram to a partial character sept-gram being extracted for the incomplete input "reminde." Each of these partial word n-grams may then be sent to the natural language analysis component 130 for analysis.

a. create r
 b. create re
 c. create rem
 d. create remi
 e. create remin
 f. create reminde It will be appreciated that each of these n-grams may be extracted in real time. So, for example, if a user is attempting to type "create reminder at 6:00 pm" the extraction component 120 will send n-grams to the natural language analysis component 130 after each letter is received.

In aspects of the technology, the natural language analysis component 130 analyzes each extracted n-gram along, including the full word n-gram, to create a set of possible domains. For example, the natural language analysis component 130 may identify a set of possible domains based on the full word n-gram "create" and each extracted n-gram associated with the incomplete input "reminde." In an aspect, one of the possible domains is an alarm domain. Other possible domains may include a contact domain, a task domain, a calendar domain, or a travel domain. The natural language analysis component 130 may have a character n-gram analyzer 132 that analyzes the received character n-grams, and a word n-gram analyzer 134 that analyzes the received word n-grams.

In an aspect, a domain set predictor 135 receives the set of possible domains identified by the natural language analysis component 130. In an embodiment, the domain set predictor uses the possible domains identified by the natural language analysis component 130 and adds, modifies, or changes the possible domains based on other contextual information. For example, information previously received, turn-based information (discussed further below), and display information may all be used to refine the set of possible domains. In an aspect, the set of possible domains is preset and includes all domains associated with dynamic system 100.

In an aspect, once the set of possible domains has been identified, the identified possible domains along with relevant n-gram and/or contextual information passes to a hypothesis generation component 140. The hypothesis generation component 140 analyzes the information and assigns a confidence number to one or more user intents (i.e., desired actions) associated with each possible domain predicted by the domain set predictor 135. The confidence score is a ranking, such as a number between 0 and 1, which represents the likelihood that a particular predicted intent is the actual intent of the user. For example, when analyzing whether the incomplete natural language expression is directed at a "create an alarm" intent in the alarm domain, the hypothesis generation component 140 may determine a confidence score for the full word n-gram "create" followed by following partial word n-grams as indicated:

| N-Gram | Confidence Score |
| --- | --- |
| a. create r | 0.5125763 |
| b. create re | 0.5324858 |
| c. create rem | 0.5567417 |
| d. create remi | 0.6224860 |
| e. create remin | 0.6629963 |
| f. create reminde | 0.7343581 |

Accordingly, the hypothesis generation component 140 analyzes the full word n-gram "create" followed by the partial word sept-gram "reminde" to determine whether the user's intent is to create an alarm in the alarm domain. The analysis results in a confidence score of ~0.73, for example. It is noted that the hypothesis generation component 140 may generate an intent hypothesis after each character is received (e.g., in real-time as the user types the character).

Other contextual information may be used by the hypothesis generation component 140. For example, the natural language analysis component 130 may determine that an incomplete natural language expression "show me directions to wash" indicates that a user's objective may be associated with the map domain (e.g., a possible domain). After such a determination, the hypothesis generation component 140 may make an intent prediction using the incomplete natural language expression. The intent prediction may be based on one or more n-grams. For example, for the incomplete natural language expression, "show me directions to wash," the hypothesis generation component 140 may determine a first predicted intent of the user 102 is to "get directions" (desired action) to a location, which is an action that may be performed in the first possible domain, e.g., the map domain. To effectuate the first predicted intent, an option to access a first domain application 160, such as a mapping application, may be provided to the user. Such an intent prediction may be based on a high probability that the partial word n-gram "Wash" is short for a geographic location, such as "Washington, Oreg." or "Washington, D.C." Determination of the probability may be based on a determination by the hypothesis generation component 140 that the device is proximate to a location containing the quad-gram wash and/or from the contextual phrase "show me directions to."

Both domain set predictor 135 and the hypothesis generation component 140 may use other information to identify the possible domain(s) and/or predicted intent(s) of the user, respectively. For example, analysis of incomplete natural language expressions in both single-turn scenarios and/or multi-turn scenarios (described in more detail below) may occur. At both the single-turn scenario and multi-turn scenario, various n-grams may be used either alone or in conjunction with the n-gram analysis described above.

A single-turn scenario is a scenario where an input/natural language expression is processed in isolation during a turn between a user 102 and the dynamic system 100. A single-turn scenario may exclusively utilize information from the currently analyzed incomplete natural language expression to analyze the incomplete natural language expression. This includes real time analysis of an incomplete natural language expression while the input is being received.

A multi-turn scenario is a scenario where an incomplete natural language expression is analyzed over more than one turn. A turn may include a user 102 typing a request to a digital assistant application, which digital assistant application may utilize an input recognition component 110 to recognize input from the user 102. The turn may start when the digital assistant application is activated and a user starts typing. The turn may end when the user stops typing and/or the digital assistant application is de-activated.

A turn includes both the natural language expression and a response/action by the dynamic system 100. That is, a first turn may include both a natural language expression and a response/action by the dynamic system 100. In other aspects, where a response from a user is detected, e.g., the selection of a particular domain application, this response is considered part of the turn. In other aspects, a multi-turn scenario indicates that information from multiple turns may be used to make a prediction regarding the incomplete natural language expression.

Accordingly, in aspects, the domain set predictor 135 may perform domain predictions using the contextual information garnered from a multi-turn scenario described above in combination with the n-gram analysis. Additionally, the hypothesis generation component 140 may also use contextual information obtained from multi-turn scenarios. For example, a first turn may include the incomplete natural language expression, "how is the weather tomor." In this example, the domain set predictor 135 may predict a possible domain as a weather domain, given the contextual turn. In addition, the hypothesis generation component 140 may analyze the n-gram "tomor" and assign a high confidence score that the user's intent in the weather domain is to "get weather for tomorrow."

A second turn may include the incomplete natural language expression, "how about this wee." In this example, the domain set predictor 135 may predict the weather domain as a possible domain. For example, the domain set predictor 135 may resolve the first turn of "how is the weather tomor" to mean that the user intends to be in the weather domain (via, for example, further interaction with the user) and use that resolution to predict the same possible domain (i.e., weather domain) for the subsequently-received incomplete natural language expression "how about this wee."

Further, an analysis of the partial word n-gram "wee" by the hypothesis generation component 140 in view of the contextual information may allow the hypothesis generation component 140 to predict a high confidence that the user is seeking weather information either about this week or this weekend. That is, based on the first turn being a request about the weather associated with a weather domain, the hypothesis generation component 140 may predict that the incomplete natural language expression of "how about this wee" is related to the first expression "how is the weather tomorrow." The hypothesis generation component 140 may receive from the domain set predictor 135 that the incomplete natural language expression "how about this wee" is intended to solicit information in the domain weather, and then further analyze the partial n-gram "wee" in context of the phrase "how about this" to determine that the user's intent is to "get weather for this week or weekend."

In another aspect, the domain set predictor 135 may, in parallel, make a determination that the incomplete natural language expression "how about this wee" is unrelated to a previous turn. Instead, for example, the domain set predictor 135 may make a determination that the user would like to access an SMS text domain. This may occur, for example, when domain set predictor 135 has associated a user's behavior with attempting to send texts without prefacing the request with "send text."

After a set of possible domains is identified and a confidence score is given to each predicted intent for each possible domain, as described above, information may be sent to a domain component 150. The information may include the predicted intent (or predicted intents) of the user, one or more n-grams, the incomplete natural language expression, and/or any contextual information. As illustrated, the domain component 150 is associated with one or more domain applications, such as a first domain application 160, a second domain application 170, and a third domain application 180. These domain applications may relate to one or more of an alarm domain application, a calendar domain application, a communication domain application, a note domain application, a reminder domain application, and the like. Other domain applications are contemplated. In an aspect, information is sent when the confidence score reaches a predetermined confidence threshold.

Upon receiving a first predicted intent from the hypothesis generation component 140, the domain component 150 opens an application such as a first domain application 160 that corresponds to the first predicted intent. For example, if the first predicted intent is to "get a route" from the user's current location to Seattle, Wash., the domain component 150 may open a map domain application.

Information relevant to the domain applications that is stored by or accessible to the domain component 150 may be sent by the domain component 150 to any of the domain applications associated with the domain component 150. For example, in an aspect, a first domain application 160 may be a map domain application executing a function "get_route." The map domain application may use input (e.g., a user destination, a user origin, etc.) and/or other information (e.g., current location based on a global positioning system (GPS)) in order to execute the function "get_route."

Information used by a domain application to perform a function is known as a slot. Further, where multiple domains have reached a high confidence, the domain component 150 may identify information for multiple slots for various domain applications, including any of a first domain application 160, a second domain application 170, and/or a third domain application 180. The identification of one or more slots for one or more domain applications is known as slot prediction.

In one aspect, slot prediction is performed using the incomplete natural language expression including an n-gram analysis. For example, slot prediction may include identifying and filling a slot of a first domain application 160, such as a first slot 162, with information garnered from semantically loaded words extracted from the incomplete natural language expression. Continuing with the above example, "show me directions to wash" may be interpreted as a user trying to get directions to Washington, Oreg. That is, the word n-gram "wash" may be interpreted to mean "Washington, Oreg." with a sufficiently high confidence level that would cause the domain component 150 to make a slot prediction regarding the location of destination in a mapping application.

For example, where a first domain application 160 is a mapping application, and the desired function is a "get_route" function, the mapping application may need to fill a first slot 162 with a destination location. Accordingly, in this example, the domain component 150 may predict that Washington, Oreg. is the destination location to fill a first slot 162. The domain component 150 may not have sufficient information to fill other slots of the first domain application to execute the "get_route" function, such as a second slot 164. Such slots may be filled in later when the dynamic system 100 receives more information.

Additionally, multi-turn scenarios may provide information to the domain component 150 sufficient to populate additional slots for domain applications, such as a second slot 164. Indeed, n-grams and other information of a previous turn may be used to supply intent information in order for the domain component 150 to make a slot prediction.

For example, a first turn of a turn may include the incomplete natural language expression, "create a meeting with Jas." In this example, the domain set predictor 135 may predict a calendar domain and the hypothesis generation component 140 may assign a high confidence level to a predicted intent of "create a meeting" using, for example, the function "create_meeting." The domain component 150 may then perform an analysis of the character tri-gram "J A S." Based on the context phrase "create a meeting," the domain component 150 may infer that the character tri-gram "J A S" is representative of a user's intent to create a meeting with Jason and may fill a first slot 162 with information for a contact named Jason.

Similarly, a second turn of the same turn may include the incomplete natural language expression, "from 2 pm to 4." In this example, the domain set predictor 135 may predict the calendar domain. The hypothesis generation component 140 may predict that the user's intent is to "set a meeting time," and the domain component 150 may make slot predictions for "start_time=2 pm" and "end_time=4 pm."

Such a determination may be made using n-gram analysis. For example, the domain component 150 may determine that the uni-gram 4 is intended to be "4 pm" with a sufficiently high confidence based on the contextual phrase "2 pm to," as well as the high confidence ranking that the previous turn was related to the calendar domain.

The dynamic system 100 may evaluate the incomplete natural language expression to determine confidence scores for domains, intents, and slots using information from the currently processed incomplete natural language expressions as well as using other contextual information from other sources. Contextual information may include information extracted from each turn in a turn. Additionally, the contextual information may include a response to a previous turn by the dynamic system 100. For example, the response to a previous turn may include how the dynamic system 100 responded to the previous request from a user (e.g., what the dynamic system provided to the user), items located on a display of the client computing device 104, text located on the display of the client computing device 104, and the like. In another case, the contextual information may include the client context. For example, client context may include a contact list on the client computing device 104, a calendar on the client computing device 104, GPS information (e.g., a location of the client computing device 104), the current time (e.g., morning, night, time zone), activities (e.g., information reflecting that the user is meeting with clients, exercising, driving, etc.), and the like. In another case, the contextual information may include knowledge content. For example, knowledge content may include a knowledge database that maps features from the incomplete natural language expression with stored data.

In aspects, an output generation component 190 generates output to user 102. For example, output generation component 190 may generate a graphical user interface that indicates that one or more domain applications with predicted slots have been previously inferred by the dynamic system 100. Accordingly, the output generation component 190 may present the one or more domain applications to the user 102. A user 102 may select the appropriate domain application, such as a first domain application 160, a second domain application 170, and a third domain application 180. In an aspect, selection of the appropriate domain application will confirm to the dynamic system 100 the domain objective and actual intent of the user.

Figure 2:
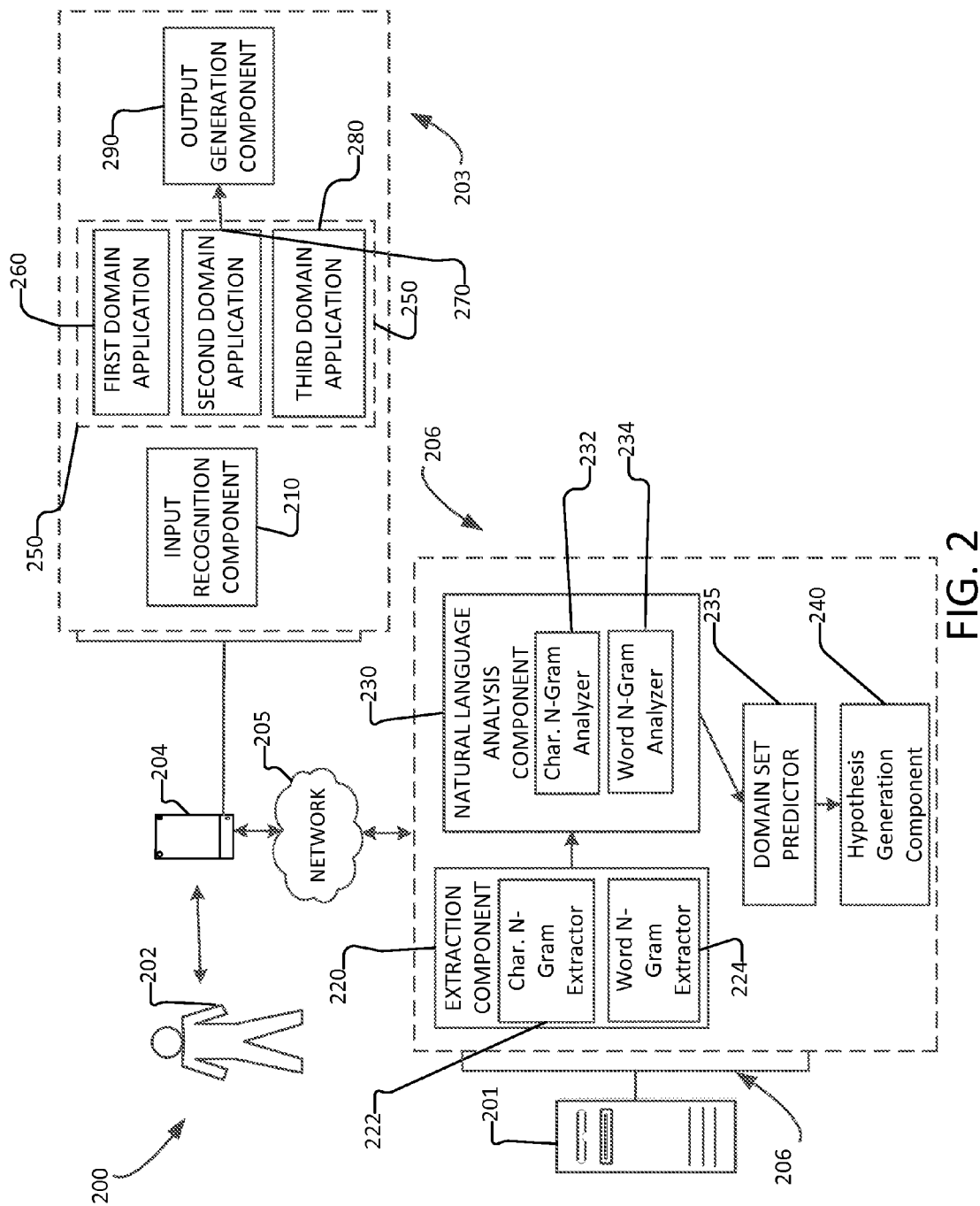
FIG. 2 illustrates a networked system for interpreting incomplete natural language expressions according to one or more aspects.

FIG. 2 illustrates a networked system 200 for understanding incomplete natural language expressions according to one or more aspects. In aspects, the networked system 200 connects a user 202 using a client computing device 204 storing a client computing environment 203 to one or more servers 201 storing a natural language analysis environment 206. Additionally, the server computing device 201 may provide data to the client computing device 204 and receive data from the client computing device 204. Such a data exchange may occur through a network 205. In one aspect, the network 205 is a distributed computing network, such as the Internet.

The client computing device 204 stores a client computing environment 203. The client computing environment 203 may include an input recognition component 210, a domain component 250 storing a first domain application 260, a second domain application 270, and a third domain application 280. Additionally an output generation component 290 may also be present in the client computing environment 203.

As illustrated, the server computing device 201 stores a natural language analysis environment 206. Though illustrated being implemented on a single server computing device 201, in aspects, the natural language analysis environment 206 may be implemented on more than one server computing device, such as a plurality of server computing devices.

The natural language analysis environment 206 may include an extraction component 220 that stores a character n-gram extractor 222 and a word n-gram extractor 224. Additionally, the natural language analysis environment 206 may also store a natural language analysis component 230 storing a character n-gram analyzer 232 and a word n-gram analyzer 234. The natural language analysis environment 206 may also store a domain set predictor 235 and a hypothesis generation component 240.

The networked system 200 may be configured to process incomplete natural language expressions. In this regard, the networked system 200 may facilitate understanding of incomplete natural language expressions using n-gram analysis and contextual information. The input recognition component 210, the extraction component 220, natural language analysis component 230, the domain set predictor 235, the hypothesis generation component 240, the domain component 250, the first domain application 260, the second domain application 270, the third domain application 280, and the output generation component 290 be configured similar to or the same as like named references described with respect to FIG. 1.

As discussed above, the natural language analysis environment 206 stored on a server computing device 201 may provide data to and from the client computing device 204 through the network 205. The data may be communicated over any network suitable to transmit data. In some aspects, the network 205 is a computer network such as the internet. In this regard, the network 205 may include a Local Area Network (LAN), a Wide Area Network (WAN), the Internet, wireless and wired transmission mediums. In this regard, the incomplete natural language expression may be received by an input recognition component 210. The input recognition component 210 may transmit the input over the network 205 for processing by the natural language analysis environment 206 on the server computing device 201. It will be appreciated that the input recognition components 110/210, the extraction component 120/220, the natural language analysis component 130/230, the domain set predictor 135/235, the hypothesis generation component 140/240, the domain component 150/250 (which stores one or more domain applications), and the output generation component 190/290 may be located at a client computing device, a server computing device, and/or both the client computing device and the server computing device in any combination. FIGS. 1 and 2 are only exemplary and should not be considered as limiting. Indeed, any suitable combination of components including client computing device and a server computing device may be used for understanding an incomplete natural language expression.

Figure 3:
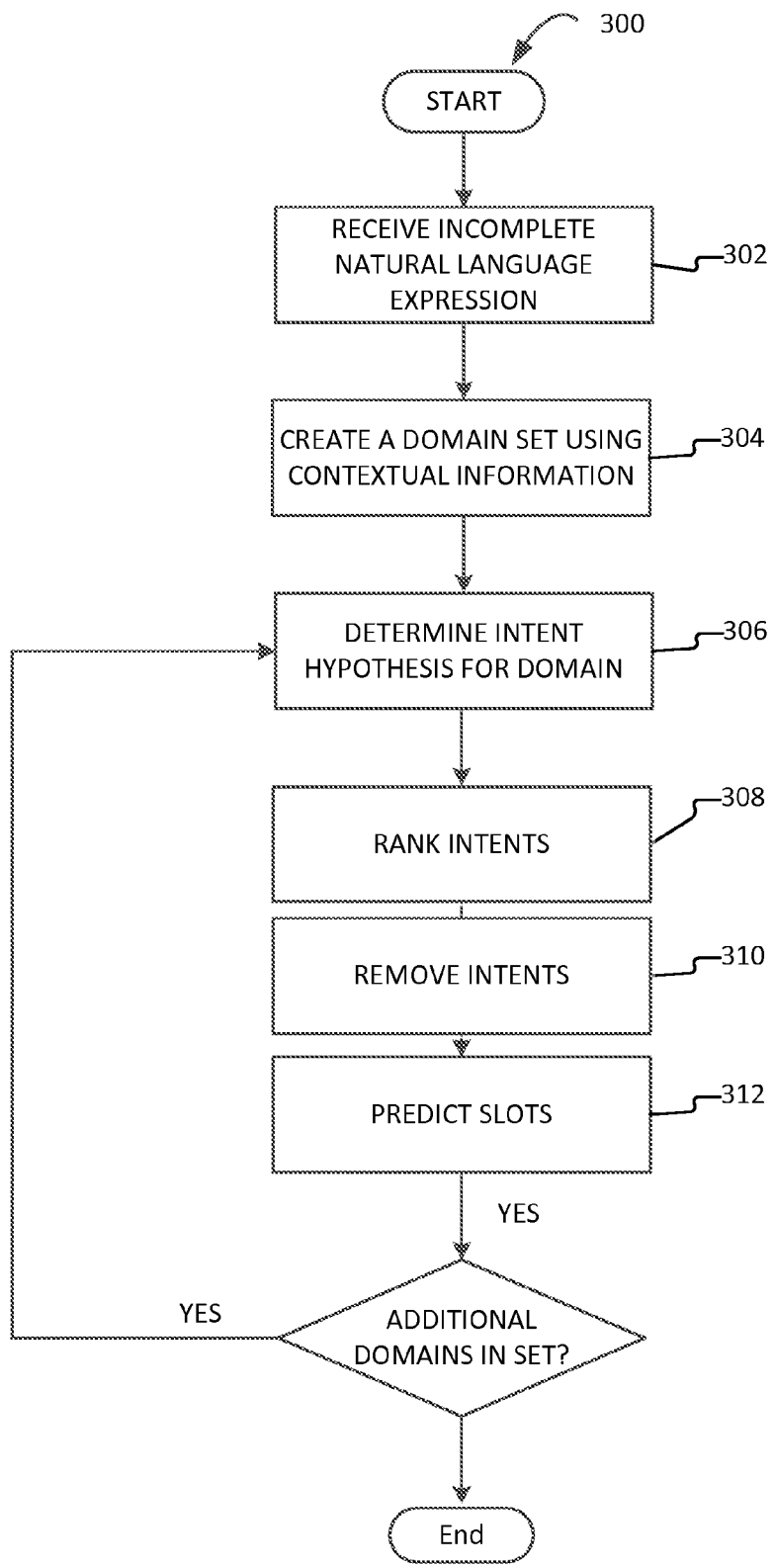
FIG. 3 illustrates a method for interpreting incomplete natural language expressions.

FIG. 3 illustrates a method for understanding incomplete natural language expressions. Method 300 begins at operation 302 where an incomplete natural language expression is received. For example, the incomplete natural language expression may be one that contains one or more incomplete phrases or words. As such, the incomplete natural language expression may comprise multiple partial word n-gram, multiple word n-gram, and multiple character n-gram. In one example, an incomplete natural language expression may include incomplete phrases, words, and/or terms in the form of a textual input, gesture input, and/or spoken language input (e.g., a user query and/or request). That is, the incomplete natural language expression may have missing information.

When an incomplete natural language expression is received at the system, flow proceeds to operation 304 where a set of possible domains is created by analyzing various n-grams of the incomplete natural language expression. For example, partial word, word, and character n-grams may be extracted from the phrase "how about tomo." In this example, one possible domain may be the calendar domain (corresponding to, for example, a completed natural language expression "how about tomorrow") and/or another possible domain may be a web search domain (corresponding to a web search of "tamales.").

Identification of possible domains may further be based on contextual information. In one aspect, contextual information may include information extracted from multiple turns of a turn. The information extracted may enable the system to make one or more domain predictions, intent predictions, and/or slot predictions (e.g., the results) based on a previous turn (e.g., a previous natural language expression/request from the current turn).

In an additional aspect, the contextual information may include client context. For example, client context may include a contact list on the client computing device, a calendar on the client computing device, GPS information (e.g., a location of the client computing device), the current time (e.g., morning, night, in a meeting, in a workout, driving, etc.), and the like. In another case, the contextual information may include knowledge content. For example, knowledge content may include a knowledge database that maps features from the incomplete natural language expression with stored data. As an example, "John Howie" may be mapped to a restaurant in the knowledge database. In this regard, a plurality of possible domains may be generated for the received incomplete natural language expression.

After the set of possible domains is created, flow proceeds to operation 306 where one or more predicted intents are determined for each possible domain. For example, each possible domain may have a corresponding set of functions associated with the domain, and each function may correspond to a desired action (e.g., a user intent). In one case, the n-grams and contextual information may be analyzed against each function (e.g., each intent) in each possible domain to determine a confidence score for each function.

When a set of intents is generated, flow proceeds to a ranking operation 308. In ranking operation 308, each intent is ranked according to a given confidence score. For example, confidence scores may be given based on contextual information and n-gram analysis.

After the set of intents is ranked, flow proceeds to operation 310 where intents with low confidence scores are removed. In aspects, removal of the intents occurs based upon a predetermined confidence threshold. For example, where a confidence score is between 0 and 1, any intent with a confidence score lower than 0.7 will be removed. Alternatively, intents may be removed if they are in the bottom portion of a ranking. For example, where ten intents have been identified, the bottom seven (by confidence score) will be removed. In some aspects, no intents are removed. Those intents with confidence scores greater than the predetermined confidence threshold may be identified as predicted intents.

Flow then proceeds to operation 312 where slots of the predicted intents are predicted. For example, where a predicted intent is "get a route," and a function of a mapping domain application is "get_route," then the function get_route may require information to execute. Such information may include a destination location or an origin location. This information (or slots) may be predicted using contextual information and n-gram analysis.

After predict slot operation 312, flow continues to determination 314. In determination 314, it is determined whether additional possible domains are in the set. If additional possible domains are in the set, the method returns to determine hypothesis for the next possible domain in the set. If no possible domains remain, the method 300 ends.

Figure 4:
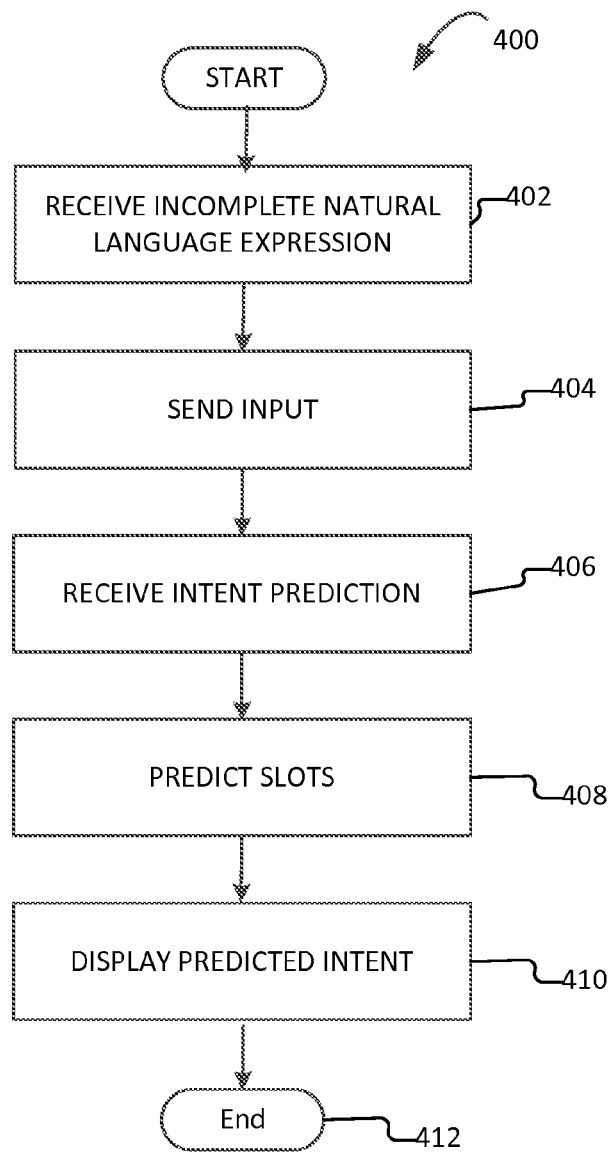
FIG. 4 illustrates a method for receiving and displaying predicted information inferred from an incomplete natural language expression.

FIG. 4 illustrates a method for receiving and displaying predicted information inferred from an incomplete natural language expression. Method 400 begins at operation 402 where an incomplete natural language expression is received. For example, the incomplete natural language expression may be one that contains one or more incomplete phrases or words. Received input may be received in the form of gestures, speech, or textual input.

From operation 402, flow proceeds to operation 404 where the input is sent out for processing. In an aspect, the information is sent to one or more servers for analysis of the incomplete natural language expression. The input may be sent over a network such as the Internet.

At operation 406 one or more intent predictions are received. The one or more intent predictions correspond to one or more possible domains. The intent predictions may be based on contextual information and n-gram analysis of the incomplete natural language expression.

Flow then proceeds to operation 408 where slots are predicted. For example, where an intent is "get_route," and a slot is a destination location, contextual information and n-gram analysis may allow the prediction of the slot to be the destination location of Washington, D.C.

Flow then proceeds to display predicted intent operation 410. In display predicted intent operation 410, the one or more predicted intents along with predicted slots may be presented to a user via, for example, a graphical user interface. For example, the predicted intent may be displayed by opening a mapping application in the graphical user interface. The mapping application may further initiate a function for getting a route and may populate predicted slots for the function such as a destination location and a current location. The user may interact with the graphical user interface to indicate that a particular predicted intent is the user's actual intent.

Figure 5:
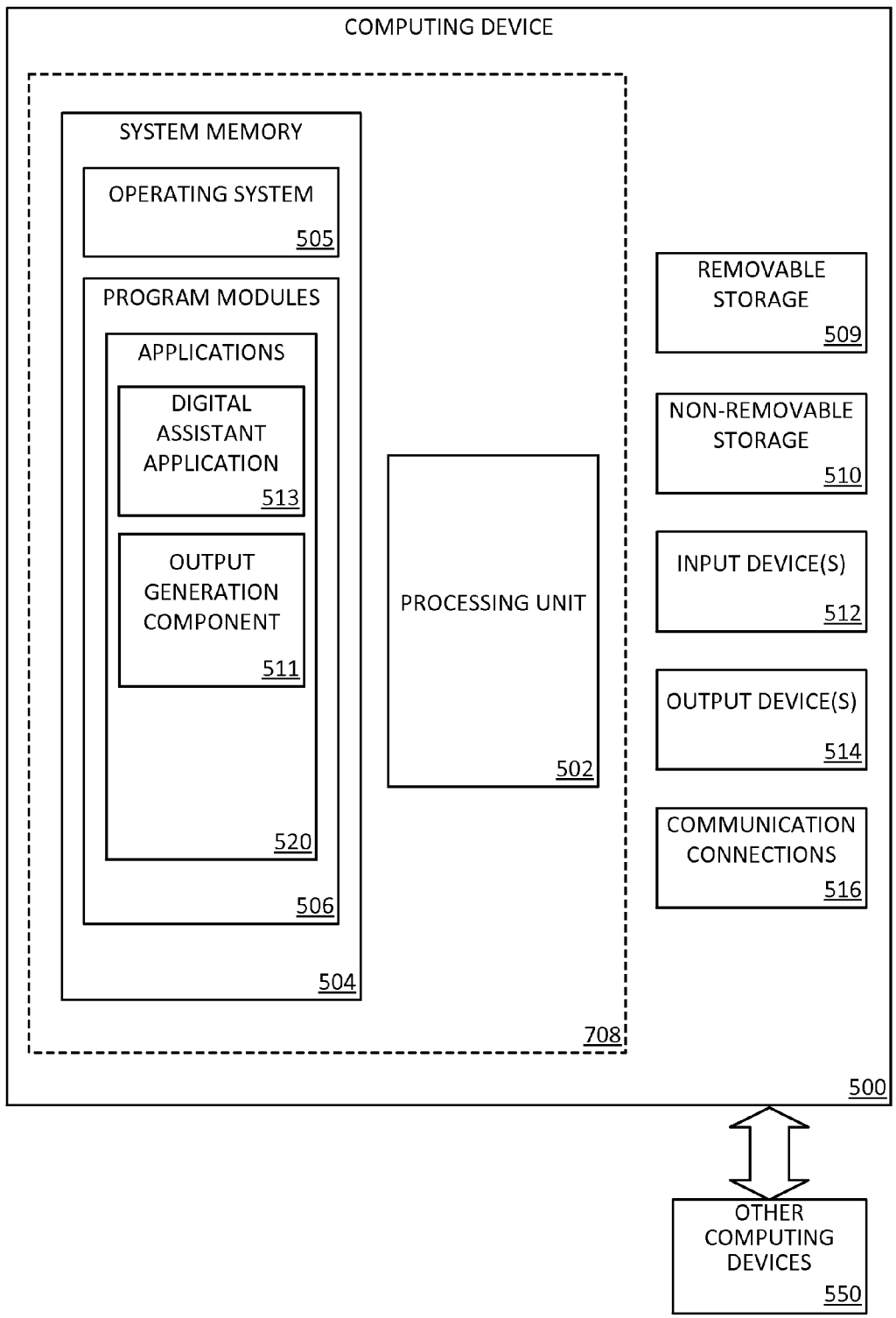
FIG. 5 is a block diagram illustrating physical components (e.g., hardware) of a computing device with which aspects of the disclosure may be practiced.

FIG. 5 is a block diagram illustrating physical components (e.g., hardware) of a computing device 500 with which aspects of the disclosure may be practiced. The computing device components described below may have computer executable instructions for a digital assistant application 513, e.g., of a client and/or computer, executable instructions for a output generation component 511, e.g., of a client, that can be executed to employ the methods 300 through 400 disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as discriminating ambiguous request applications in regards to FIGS. 1-3 and, in particular, digital assistant application 513 or output generation component 511. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., output generation component 511 or digital assistant application 513) may perform processes including, but not limited to, the aspects, as described herein. Other program modules that may be used in accordance with aspects of the present disclosure, and in particular for understanding of incomplete natural language expressions.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
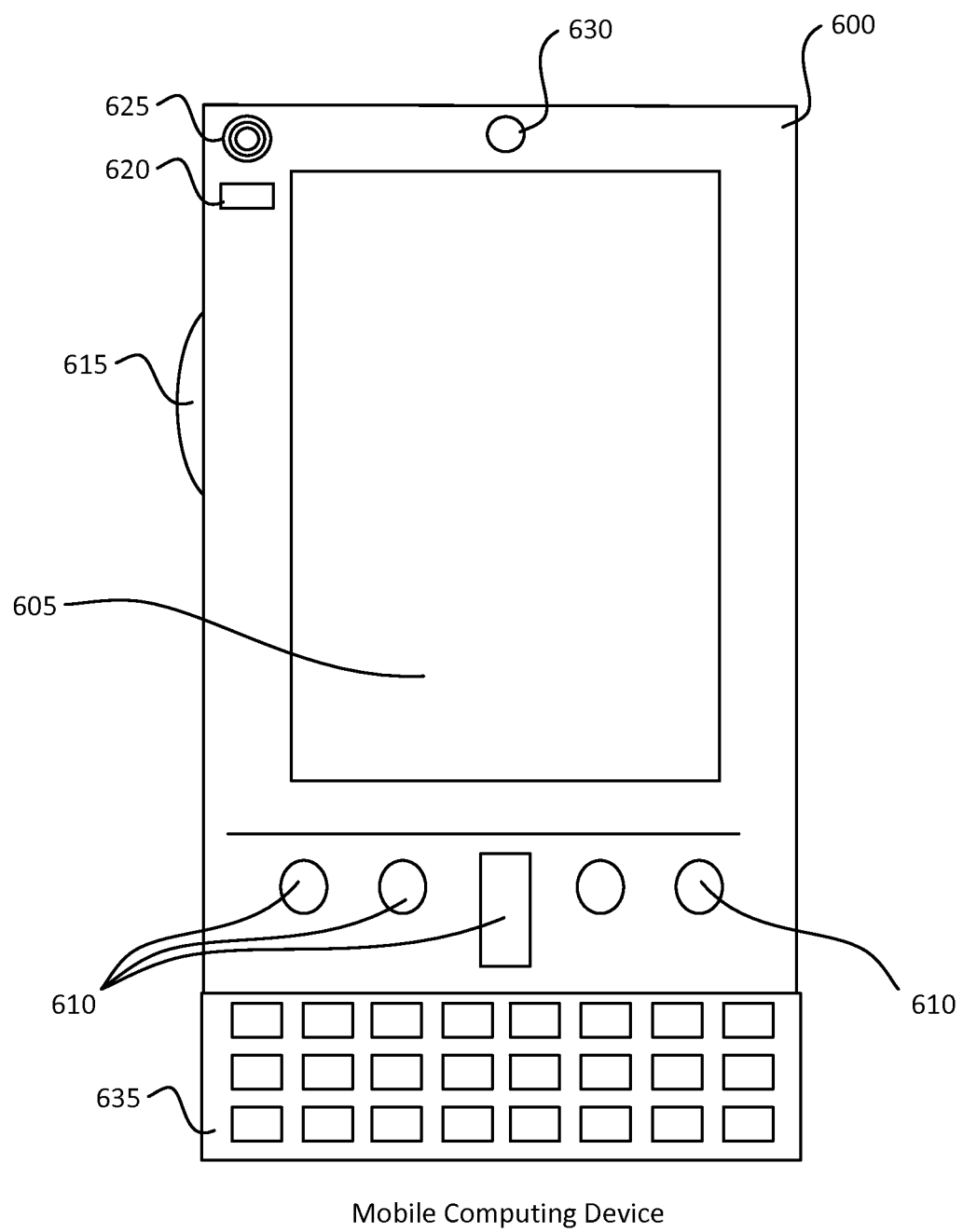
FIG. 6A illustrates one aspect of a mobile computing device 600 for implementing the aspects is of the technology.
Figure 6B:
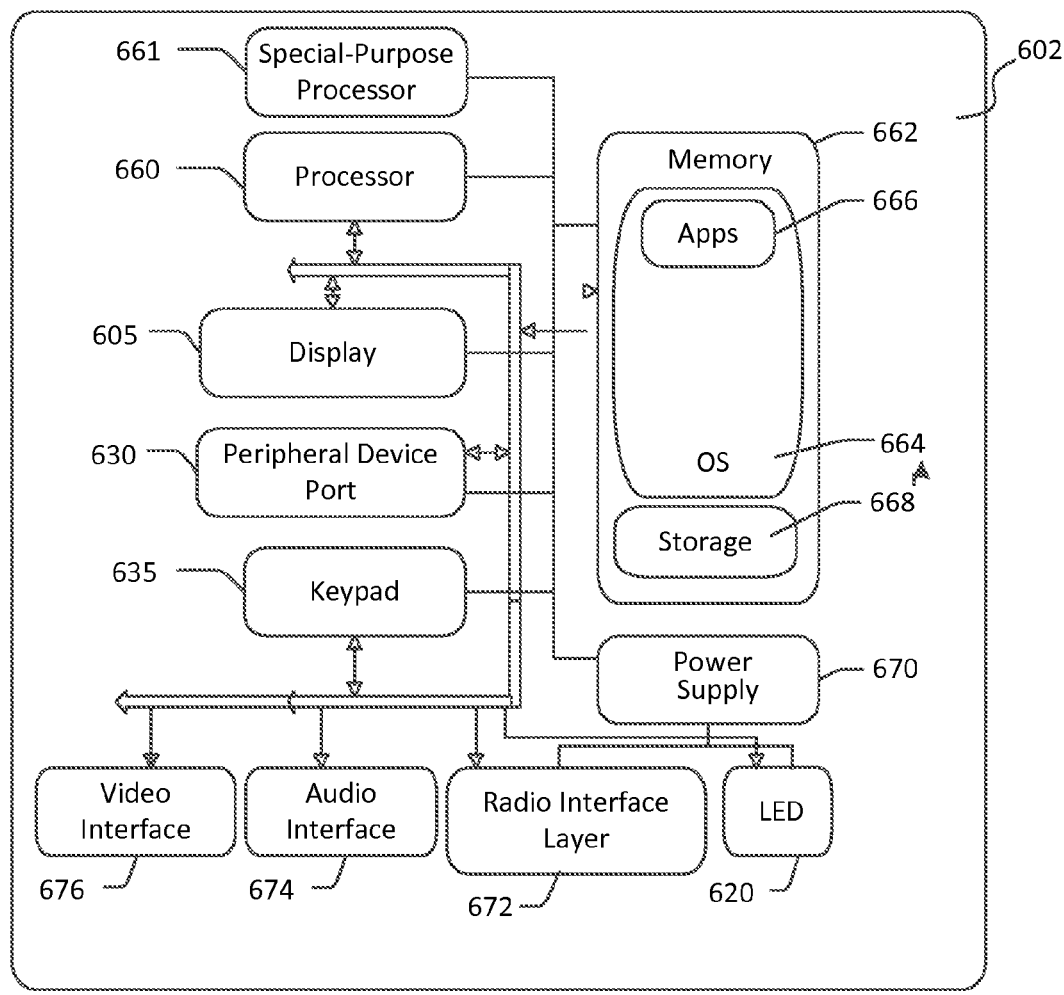
FIG. 6B is a block diagram illustrating the architecture of one aspect of a mobile computing device.

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 666 within the memory 662. The non-volatile storage area 666 may be used to store persistent information that should not be lost if the system 602 is powered down. The application programs 666 may use and store information in the non-volatile storage area 666, such as e-mail or other messages used by an e-mail application, and the like. A synchronization application (not shown) also resides on the system 602 and is programmed to interact with a corresponding synchronization application resident on a host computer to keep the information stored in the non-volatile storage area 666 synchronized with corresponding information stored at the host computer. As should be appreciated, other applications may be loaded into the memory 662 and run on the mobile computing device 600, including the instructions to create a calendar event as described herein (e.g., and/or optionally calendar event creation module 711).

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
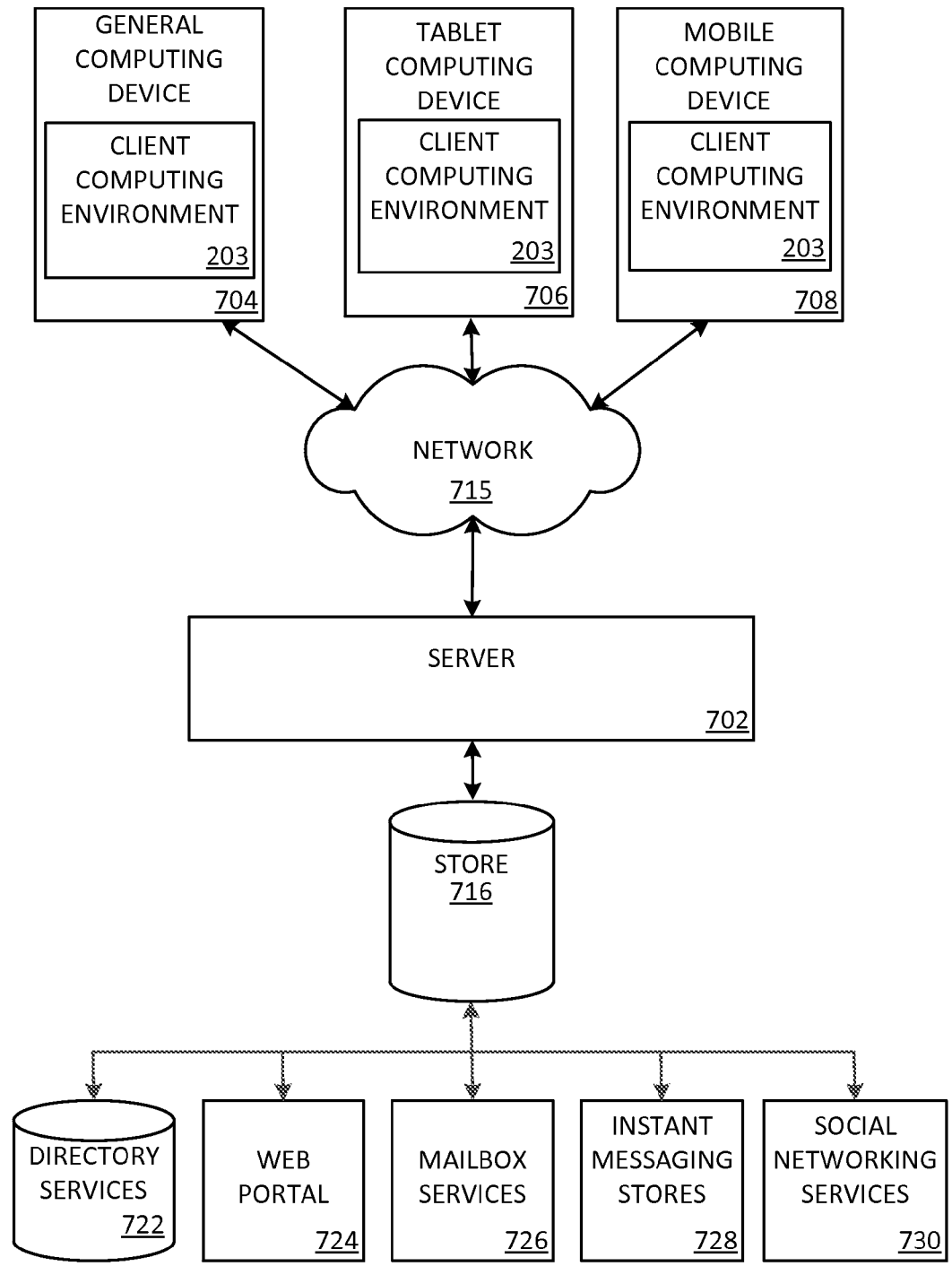
FIG. 7 illustrates one aspect of the architecture of a system for processing data received at a computing system from a remote source, such as a computing device, tablet, or mobile device.

FIG. 7 illustrates one aspect of the architecture of a system for processing data received at a computing system from a remote source, such as a computing device 704, tablet 706, or mobile device 708, as described above. Content displayed at server 702 may be stored in different communication channels or other storage types. For example, various documents may be stored using a directory service 722, a web portal 724, a mailbox service 726, an instant messaging store 728, or a social networking site 730. The client computing environment 203 may be employed by a client who communicates with server 702. The server 702 may provide data to and from a client computing device such as a personal computer 704, a tablet computing device 706 and/or a mobile computing device 708 (e.g., a smart phone) through a network 715. By way of example, the computer system described above with respect to FIGS. 1-2 may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
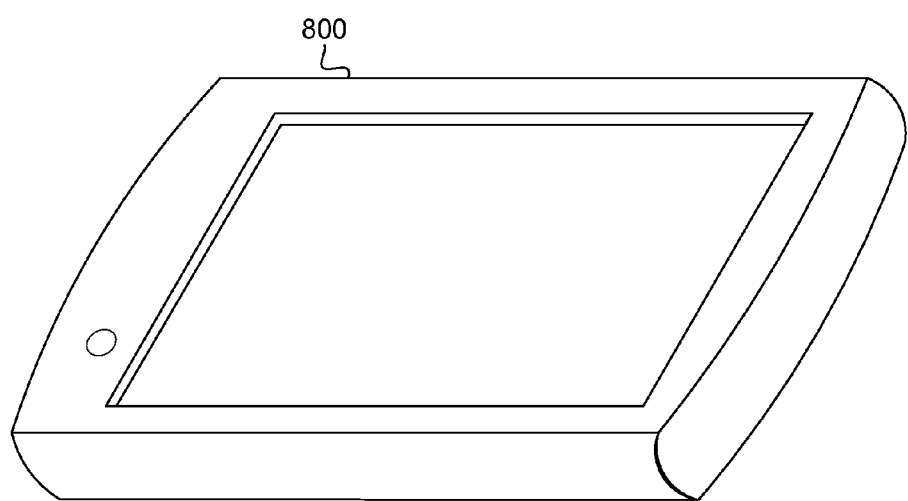
FIG. 8 illustrates an exemplary tablet computing device that may execute one or more aspects disclosed herein.

FIG. 8 illustrates an exemplary tablet computing device 8 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
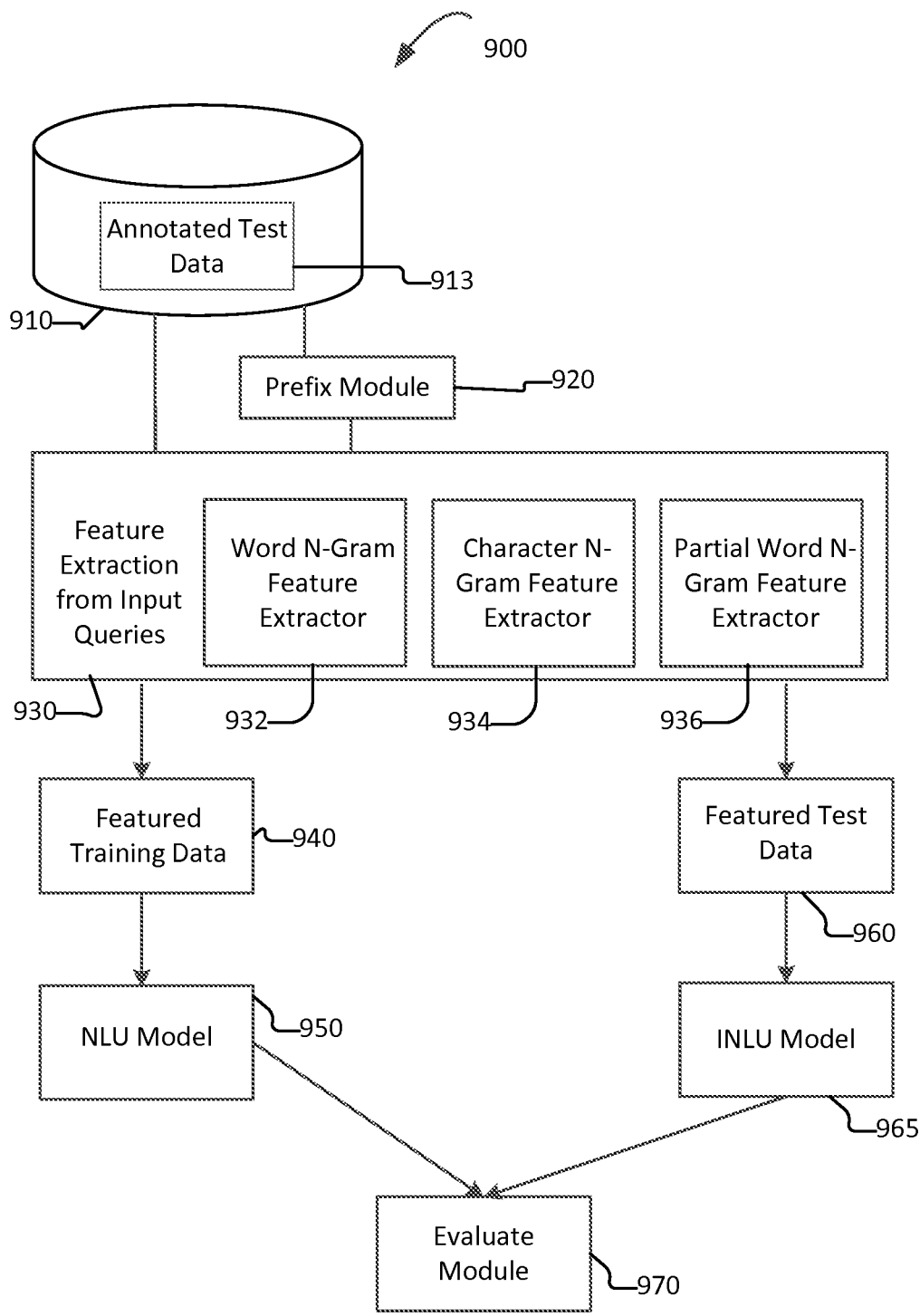
FIG. 9 illustrates a system to build an incomplete natural language expression analysis model.

FIG. 9 illustrates a system 900 to build an incomplete natural language expression analysis model. In aspects, system 900 builds a natural language model and an incomplete natural language model using annotated test data. For example, system 900 may use full queries or partial queries as annotated test data, and pass the query through an n-gram analysis feature extractor in order to create a natural language model. The system may analyze the natural language model to determine accuracy using the annotations as guides. Additionally, the system may then use those same full queries, remove characters to create an incomplete natural language expression, pass the incomplete natural language expression through an n-gram analysis feature extractor in order to create an incomplete natural language model. The models may then be compared to determine accuracy using the annotations as a guide. Additionally, previously processed incomplete natural language queries may be used and passed through the incomplete natural language model to train the model. Various components of system 900 may then be modified in order to get a more accurate natural language model and/or a more accurate incomplete natural language model.

In aspects of the technology, system 900 includes annotated test data 913 stored in an annotated storage device 910. Annotated training data means data is tagged with information related to domain, intents and/or slots. For example, a query "remind me to move my car in two hours," the user's intent is tagged as "create_single_reminder," the domain is tagged as "reminder" domain, the slot information reminder text is tagged as "move my car," and the slot information reminder start time is tagged as "in two hours." Being tagged means that the domain, intents, and slot predictions have been identified as correctly reflecting the user intent.

Additionally, annotated test data may include the results of previously processed incomplete natural language expressions. Processing may occur by a natural language analysis component, such as a natural language analysis component 130 or natural language analysis component 230 discussed with reference to FIG. 1 and FIG. 2, respectively. For example, the user may have confirmed the accuracy of predicted domain, intent, and slots generated by a system for interpreting natural language expressions, such as dynamic system 100 and networked system 200. Accordingly, the annotated test data 913 may include the incomplete natural language expression, and the expression will be tagged with the domain, intent, and slot as confirmed by the user.

Contextual information may also be associated with the annotated test data 913. For example, where annotated test data 913 was populated with previously processed incomplete natural language expressions, contextual information may include information extracted from each turn in a turn, responses to a previous, items located on a display of the client computing device, text located on the display of the client computing device, client context (e.g., client contact lists, a calendar, GPS information, time that the incomplete natural language was received) and the like.

The natural language query may then be passed to an n-gram analysis feature extractor 930. The n-gram analysis feature extractor 930 may have a word n-gram feature extractor 932, a character n-gram feature extractor 934, and a partial word n-gram feature extractor 936. Each extractor may extract partial word n-grams, word n-grams, and character n-grams to create a first feature training data set 940. N-gram extraction may be performed in a similar fashion as referred to in FIGS. 1 and 2.

The featured training data set 940 may then be used by a natural language model stored in natural language understanding (NLU) component 950 to predict domain, intent, and slots. Prediction of domain, intent, and slots may occur similar or the same as predictions described above.

Various features are used to train NLU model 950. For example, word n-grams, partial n-grams, and partial word n-grams may be used to train the natural language model. Additionally, entity lexicons may be used to train then NLU model. Each lexicon is a set of entities that belong to the same semantic class. For example, a set of movie names, application names, etc. are all considered entity lexicons. Training the NLU model results in more accurate domain, intent, and slot predictions.

A prefix module 920 may create an incomplete natural language expression from the same query passed to the NLU model. Continuing with the above example, the query "remind me to move my car" may be parsed into "remind m," remind me, "remind me t," etc.

Alternatively, when a previously processed incomplete natural language expression is used, the annotated test data does not pass through the prefix module, but merely passes to the incomplete the n-gram analysis feature extractor 930.

The incomplete natural language expression may then pass to an n-gram analysis feature extractor 930. The n-gram natural language feature extractor 930 extracts word n-grams, partial word n-grams, and character n-grams as described above. This extracted information is then passed to featured test data 960.

The featured test data 960 may then be used by an incomplete natural language model stored in incomplete natural language understanding (INLU) component 965 to predict domain, intent, and slots. Prediction of domain, intent, and slots may occur similar or the same as predictions described above.

Various features are used to train INLU model 965. For example, word n-grams, partial n-grams, and partial word n-grams may be used to train the natural language model. Additionally, entity lexicons may be used to train then INLU model. Each lexicon is a set of entities that belong to the same semantic class. For example, a set of movie names, application names, etc. are all considered entity lexicons. Training the INLU model results in more accurate domain, intent, and slot predictions.

In an aspect, the prediction of the NLU model and/or the INLU Model is evaluated against the tagged actual domain, intent, and slots. If appropriate, the NLU model and/or the INLU model are adjusted.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system comprising:
   at least one processor; and
   memory encoding computer executable instructions that, when executed by at least one processor, perform a method for interpreting incomplete natural language expressions, the method comprising:
      receiving input from a client device, the user input comprising an incomplete natural language expression, wherein the incomplete natural language expression is a string of characters with one or more missing characters;
      extracting one or more n-grams from the incomplete natural language expression;
      analyzing the extracted one or more n-grams to determine a set of possible domains;
      assigning a confidence level to each possible domain of the set of possible domains, wherein the confidence level for at least one possible domain exceeds a predetermined confidence threshold;
      predicting an intent of a user associated with the at least one possible domain; and
      initiating at least one domain application for performing the predicted intent;
      predicting at least one slot for executing at least one function;
      receiving a selection, wherein the received selection indicates confirmation that the at least one function reflects an actual intent of the user; and training a natural language analysis component based on at least the received selection indicating confirmation.

2. The system of claim 1, further comprising:
presenting a graphical user interface for initiating the at least one domain application, the at least one domain application associated with at least one function for performing the predicted intent.

3. The system of claim 1, further comprising:
analyzing contextual information to determine the set of possible domains.

4. The system of claim 1, wherein the set of possible domains includes a calendar domain, an alarm domain, and a travel domain.

5. The system of claim 1, wherein the n-gram is a word n-gram, a partial word n-gram, or a character n-gram.

6. A computer implemented method, comprising:
receiving input from a client device, the user input comprising an incomplete natural language expression, wherein the incomplete natural language expression is a string of characters with one or more missing characters;
extracting one or more n-grams from the incomplete natural language expression;
analyzing the extracted one or more n-grams to determine a set of possible domains;
assigning a confidence level to each possible domain of the set of possible domains, wherein the confidence level for at least one possible domain exceeds a predetermined confidence threshold;
predicting an intent of a user associated with the at least one possible domain;
initiating at least one domain application for performing the predicted intent;
predicting at least one slot for executing at least one function; and
receiving a selection, wherein the received selection indicates confirmation that the at least one function reflects an actual intent of the user;
training a natural language analysis component based on at least the received selection indicating confirmation and the contextual information.

7. The method of claim 6, further comprising:
presenting a graphical user interface for initiating the at least one domain application, the domain application associated with at least one function for performing the predicted intent.

8. The method of claim 7, further comprising:
predicting at least one slot for executing the at least one function; and
receiving a selection, wherein the received selection indicates confirmation that the at least one function reflects an actual intent of the user.

9. The method of claim 6, wherein assigning a confidence level comprises assigning a number from 1 to 0 to each possible domain.

10. The method of claim 6, further comprising:
analyzing contextual information to determine the set of possible domains.

11. The method of claim 6, wherein the set of possible domains includes a calendar domain, an alarm domain, and a travel domain.

12. The method of claim 1, wherein the n-gram is a word n-gram, a partial word n-gram, or a character n-gram.

13. A computer readable storage device storing instructions that when executed perform the method of:
receiving textual input from a client device, the user input comprising an incomplete natural language expression, wherein the incomplete natural language expression is a string of characters with one or more missing characters;
extracting one or more n-grams from the incomplete natural language expression;
analyzing the extracted one or more n-grams to determine a first set of possible domains;
assigning a confidence level to each possible domain of the first set of possible domains, wherein the confidence level for at least one possible domain exceeds a predetermined confidence threshold;
predicting an intent of a user associated with the at least one possible domain;
initiating at least one domain application for performing the predicted intent;
predicting at least one slot for executing at least one function; and
receiving a selection, wherein the received selection indicates confirmation that the at least one function reflects an actual intent of the user;
training a natural language analysis component based on at least the received selection indicating confirmation.

14. The computer readable storage device of claim 13, further comprising:
presenting a graphical user interface for initiating the at least one domain application, the domain application associated with at least one function for performing the predicted intent.

15. The computer readable storage device of claim 14, further comprising:
predicting at least one slot for executing the at least one function; and
receiving a selection, wherein the received selection indicates a confirmation that the at least one function reflects an actual intent of the user.

16. The computer readable storage device of claim 13, wherein assigning a confidence level comprises assigning a number from 1 to 0 to each possible domain.

17. The computer readable storage device of claim 13, further comprising:
analyzing contextual information to determine a second set of possible domains.

18. The computer readable storage device of claim 13, wherein the set of possible domains includes a calendar domain, an alarm domain, and a travel domain.

19. The computer readable storage device of claim 13, wherein the n-gram is a word n-gram, a partial word n-gram, or a character n-gram.

* * * * *